United States Patent
Madey et al.

[11] 4,283,687
[45] Aug. 11, 1981

[54] FREE ELECTRON LASER WITH END TAPERED WIGGLER STRENGTH

[75] Inventors: John M. J. Madey, Palo Alto; Luis R. Elias, Mountain View; Todd I. Smith, Palo Alto, all of Calif.

[73] Assignee: The United States of America as represented by the Secretary of the Air Force, Washington, D.C.

[21] Appl. No.: 61,557

[22] Filed: Jul. 27, 1979

[51] Int. Cl.³ .......................... H01S 3/09; H01S 3/14
[52] U.S. Cl. .............................. 331/94.5 PE; 330/4.3
[58] Field of Search .................. 331/94.5 PE, 94.5 P; 335/213, 210; 315/3, 4, 5; 330/4.3

[56] References Cited

U.S. PATENT DOCUMENTS

| | | |
|---|---|---|
| 2,082,121 | 6/1937 | Rypinski . |
| 2,515,874 | 7/1950 | Hoyler et al. . |
| 2,999,978 | 9/1961 | Pinkley . |
| 3,197,680 | 7/1965 | Wingerson .......................... 335/213 |
| 3,398,376 | 8/1968 | Hirshfield ............................... 315/5 |
| 3,822,410 | 7/1974 | Madey ......................... 331/94.5 PE |

OTHER PUBLICATIONS

Elias et al., Physical Review Letters, vol. 36, No. 13, Mar. 29, 1976, pp. 717-720
Deacon et al., Physical Review Letters, vol. 38, No. 16, Apr. 18, 1977, pp. 892-894.

Primary Examiner—William D. Larkins
Attorney, Agent, or Firm—Donald J. Singer; Willard R. Matthews

[57] ABSTRACT

Improved gain and the elimination of beam insertion and extraction compensation in free electron lasers is realized by means of a helical periodic magnet. The magnet comprises one or more layers of coaxial bifilar helical conductors each being 180° displaced and conducting current in opposite directions. The end portions of the magnet are tapered by extending successive layers one or more turns to provide a field gradient that uniformly decreases to zero.

1 Claim, 6 Drawing Figures

FREE ELECTRON LASER WITH END TAPERED WIGGLER STRENGTH

STATEMENT OF GOVERNMENT INTEREST

The invention described herein may be manufactured and used by or for the Government for governmental purposes without the payment of any royalty thereon.

BACKGROUND OF THE INVENTION

This invention relates to free electron lasers and other spontaneous radiation generating systems and in particular to a new and improved high gain helical magnet and its application to such devices and systems.

Conventional lasers are based on the radiation emitted by an electron bound to an atom or molecule. In the free electron laser the initial and final states of the electron correspond to specific states of motion of an electron in a spatially periodic magnetic field. Both the initial and final states are free. The free electron laser is described in detail in U.S. Pat. No. 3,822,410 of John M. Madey entitled STIMULATED EMISSION OF RADIATION IN PERIODICALLY DEFLECTED ELECTRON BEAM, issued July 2, 1974.

State of the art devices of this type have utilized magnets that permit only limited gain and require position and angular correction of the inserted and extracted beam. The same deficiencies limit the effectiveness of the simple transverse magnets commonly used in the generation of spontaneous radiation.

There currently exists, therefore, the need for magnet means for use in such devices and systems that provides improved system gain and eliminates complex and costly beam insertion and extraction compensation. The present invention comprehends a double helix periodic magnet that satisfies this need.

SUMMARY OF THE INVENTION

The invention provides a means for the generation of an intense spatially periodic magnetic field. If a high current relativistic electron beam is injected into such a field both spontaneous and stimulated radiation occur leading to the possibility of laser action at wavelengths from the infrared through the visible.

Basically, the invention consists of a long winding in the form of a double helix. The currents in the two strands of the double helix flow in opposite directions. The magnetic field on axis is purely transverse and rotates in space with the period of the helix.

The winding is reduced in thickness at the ends of the helix to provide a magnetic field which increases slowly from zero outside the magnet to the full value inside the full helix. This form of winding greatly simplifies the problems associated with the injection and extraction of the electron beam.

It is a principal object of the invention to provide a new and improved helical periodic magnet.

It is another object of the invention to provide a periodic magnet adapted to provide higher gain in a free electron laser.

It is another object of the invention to provide a periodic magnet for use in a free electron laser that is inexpensive and simple to construct.

It is another object of the invention to provide a periodic magnet for use in a free electron laser that eliminates the need for beam insertion and extraction compensation.

These together with other objects features and advantages of the invention will become more readily apparent from the following detailed description when taken in conjunction with the illustrative embodiments in the accompanying drawings.

DESCRIPTION OF THE PREFERRED EMBODIMENT OF THE INVENTION

Figure 1:
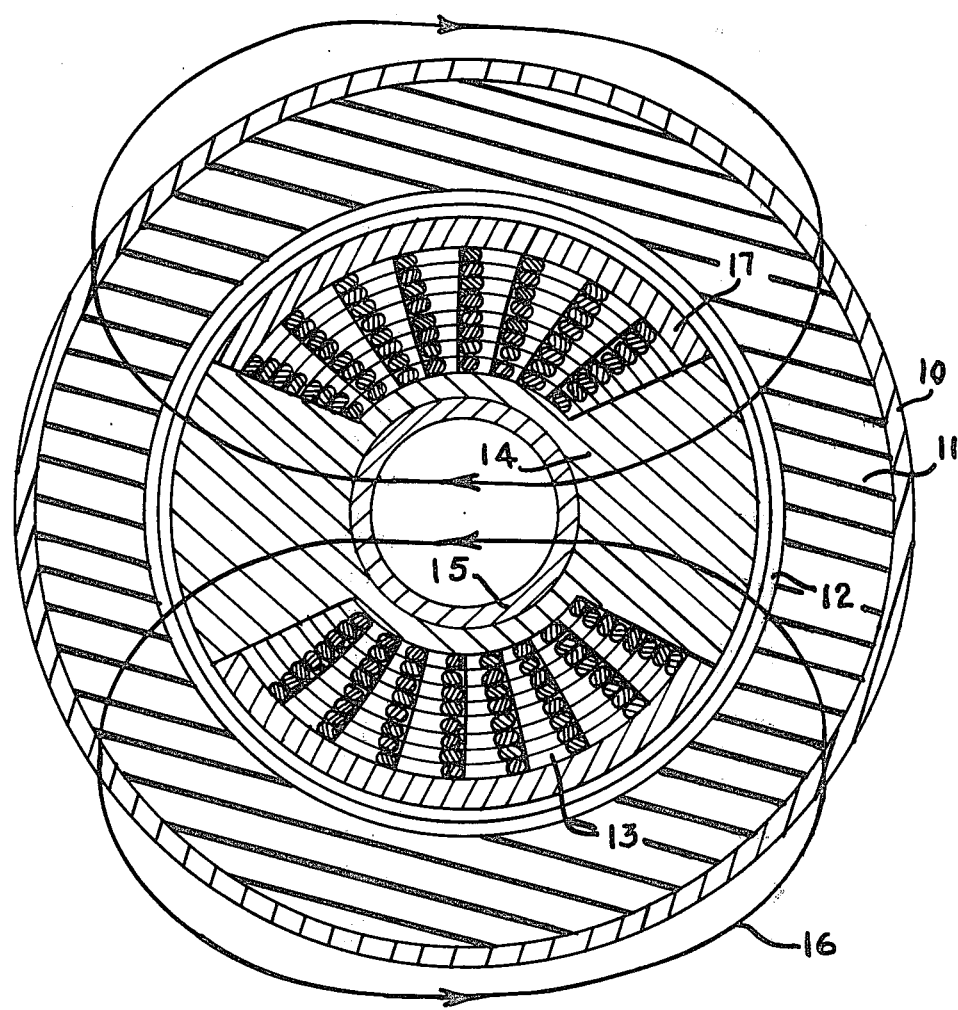
FIG. 1 is a sectional view of a free electron laser incorporating the helical periodic magnet of the invention.

The present invention comprehends a magnet for use in a free electron laser. FIG. 1 illustrates a cross sectional view of this type of laser incorporating the helical periodic magnet of the invention. It consists of aluminum jacket 10, epoxy encapsulation 11, two layer solinoid 12 wound over aluminum separator 17, superconducting helical winding 13, winding support form 14 and evacuated copper drift tube 15.

Figure 2:
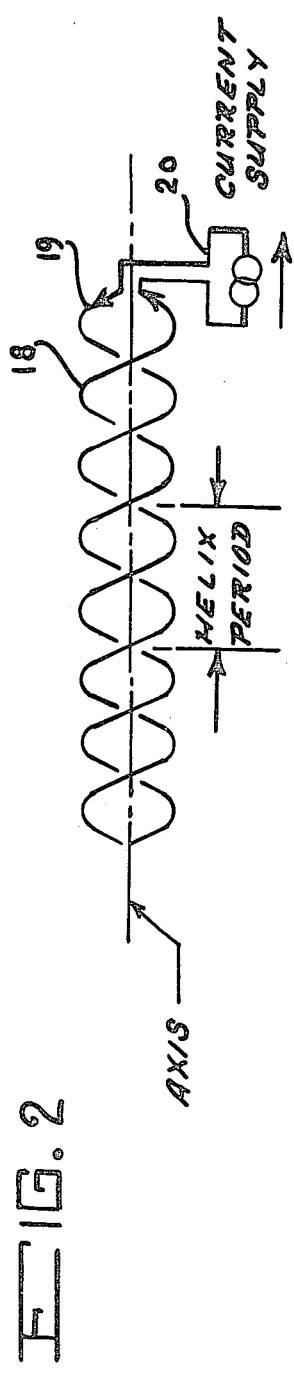
FIG. 2 is a schematic drawing of the helical windings of the periodic magnet of the invention.

In essence, the magnet consists of a pair of windings 18, 19 each in the form of a helix as indicated in FIG. 2. As such it constitutes a double or bifilar helix. As used herein the term bifilar conductor is defined as involving a single wire doubled back on itself and the term bifilar conductor means is defined as one or more layers of bifilar wires or conductors. The windings share a common axis and are disposed at 180°; that is, a line joining the center of the windings passes through the axis as shown in the cross sectional view of FIG. 1.

The current from current supply 20 in the two windings flows in opposite directions. The effect is to generate on the axis, a transverse magnetic field which is perpendicular to the line connecting the centers of the windings as shown by flux lines 16 of FIG. 1. Because the plane on the windings rotates with the period of the helix as the position along the axis is changed, the direction of the magnetic field also rotates with axial position. As described below, the thickness of the windings can be reduced at the ends of the helix to generate a field which falls smoothly and gradually to zero.

As used in the free electron laser, the windings are formed around an evacuated metallic tube (tube 15 of FIG. 1). A relativistic electron beam is sent through the tube on the axis of the magnet. The electrons radiate light in the direction of motion at the wavelength $$\lambda \approx (\lambda_q/2\gamma^2)\left[1 + \frac{\lambda_q eB^2}{2\pi mc^2}\right]^{\frac{1}{2}}$$

where $\lambda_q$ is the magnet period, m is the electron rest mass, c is the speed of light, and e is the electron charge (cgs units). In this equation, B specifies the helical magnetic field and $\lambda mc^2$, the electron energy. As previously described, light of this wavelength passing through the helical field on axis with the electron beam will also be amplified.

It has been determined that the helical magnet of the invention will provide a higher laser gain per unit length than any of the alternative geometries or prior art structures considered. It also has a mechanical advantage in that it is a particularly simple structure to fabricate.

Figure 3:
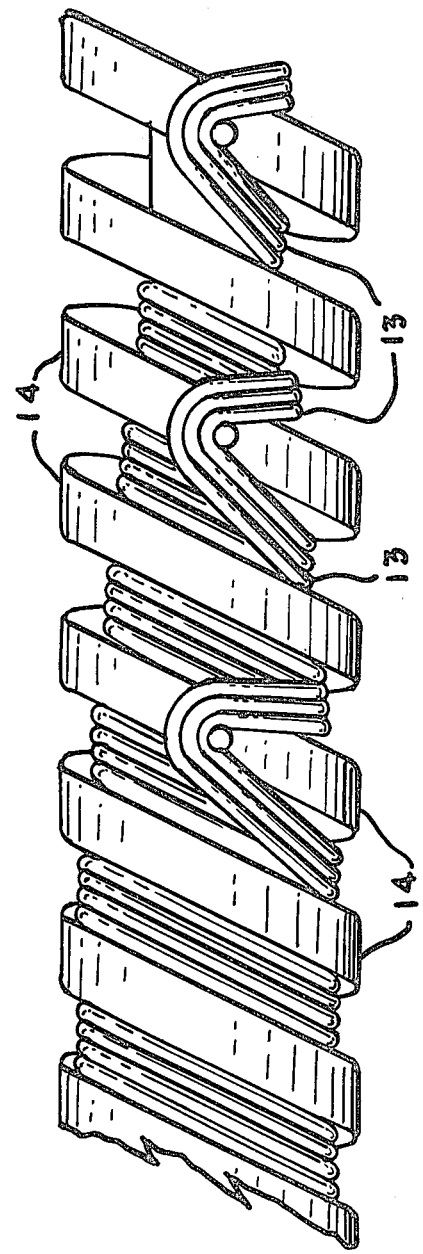
FIG. 3 is a drawing illustrating a tapered end stage of the periodic magnet of the invention.

It is also a feature of the invention to taper the windings of the helix at the ends in order to provide a uniform field gradient that decreases to zero. This is illustrated in FIG. 3 wherein subsequent layers of superconducting wires 13 are extended by one turn in the end stage of the magnet.

While the reduction in thickness of the windings at the helix's ends is not fundamental to the operation of the laser, it simplifies the injection of the electron beam into the helical field. In all cases the electron beam must be made to move as nearly as possible along the axis of the magnet. In general, the magnetic field produced by the windings extends somewhat beyond the windings. The deflection of the electrons produced by this "fringing field" must be compensated for when injecting the electron beam into the magnet. By reducing the field gradually to zero by reducing the winding thickness, only a small correction in the position of the electron beam is required at the entrance to the magnet. By comparison, if the windings were stopped abruptly, an angular correction would be required in addition to a correction in position. Moreover, the position and angular correction required for the abruptly terminated helix would be difficult to compute from first principles and would have to be determined empirically —further complicating the problem.

A helical magnet has been fabricated that used superconducting wire and that was operated at liquid helium temperature (approximately 4° K.). It would also be possible to use a normal metal, although in this case the current density in the windings would need to be reduced. Also, while the magnet referred to used no iron, it would be possible to enclose the magnet in an iron jacket to reduce the reluctance and increase the field on axis.

Although the helical magnet described in this disclosure was fabricated for use with a free electron laser, its value derives from the fact electrons moving on the axis through a helical magnet are continually accelerated through the field resulting in the highest possible spontaneously radiated power. The spontaneous power for an electron moving through a helical magnet is, for example, twice the power for an electron moving through a simple transverse magnet with the same field strength. The difference in spontaneous power is reflected in the gain which is a factor of two higher for the helical magnet. But the improvement in the spontaneously radiated power also makes the helix attractive for applications in which the primary interest is in spontaneous radiation. For example, quite intense spontaneous narrow band X-radiation could be generated simply by installing the helical magnet within a storage ring without the use of mirrors. Finally, the gradual reduction of the thickness of the windings (and, therefore, the magnetic field) at the ends of the magnet to suppress the transverse displacement of the electron beam would work equally well for a simple transverse magnet as for a helical magnet.

By way of describing its principal of operation the following is an attempt to develop a qualitative picture of the invention relating the flow of currents in the windings to the magnetic field, the rotation of the field with the helix period, and the effect on the field of the winding thickness reduction at the helix ends.

Figure 4A:
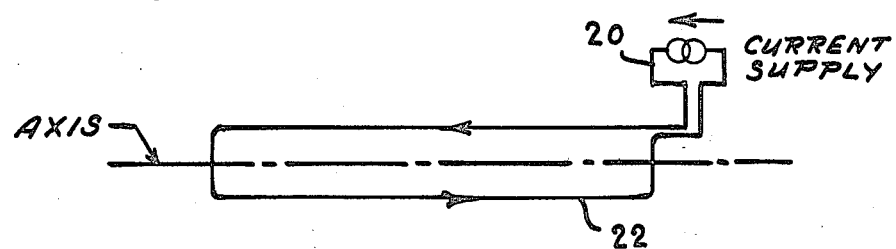
FIGS. 4a and 4b are schematic drawings of a long loop illustrating the principle of operation of the invention.
Figure 4B:
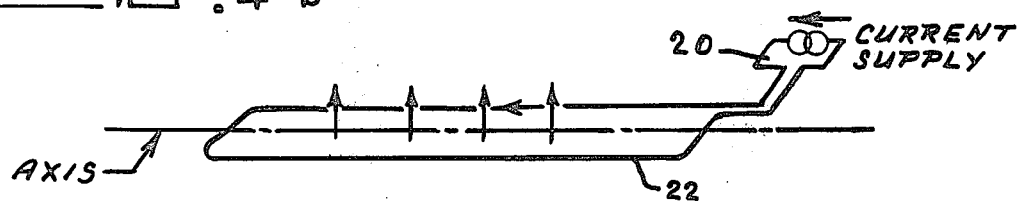

The magnetic field produced by the magnet can most easily be visualized by starting with the field produced by a long loop 22 shown in FIG. 4a and in isometric projection in FIG. 4b. The magnetic field at the center of the loop is normal to the plane of the loop, and is related to the current in the loop by the right hand rule. If the loop is twisted to form a double helix, the local magnetic field retains its relation to the wires immediately adjacent. Thus, the magnetic field on the axis of the twisted loop will rotate with the period of the twist.

Figure 5:
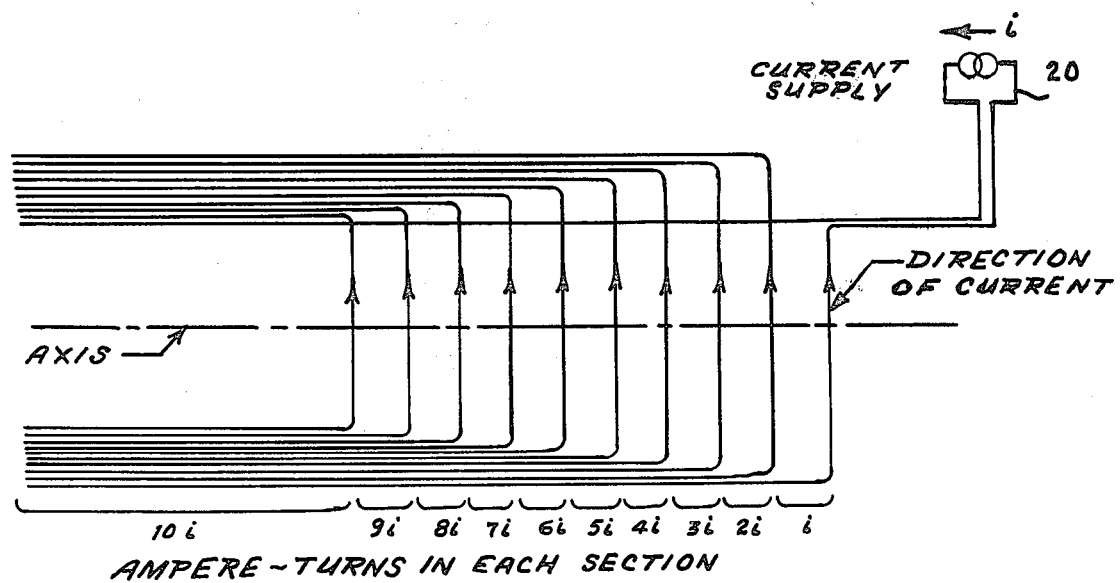
FIG. 5 is a schematic drawing of a 10-turn loop with extended ends to illustrate the effect of winding thickness.

The loop model can also be used to visualize the effect of the reduced thickness at the magnet's ends. In FIG. 5 there is illustrated a loop in which the main portion of the loop is formed from ten turns of wire. However, the wire at the two ends of the loop has been extended slightly on each successive turn so that the net current flowing along the sides of the loop is reduced by 10 percent for each turn extending beyond the main body of the loop. Because the field at the center of the loop is proportional to the current in the adjacent conductors, the magnetic field will also decrease starting from its maximum value within the loop to zero outside the last turn. If the loop is twisted, as previously described, the effect will be to generate a helical magnetic field with similar dependence of field strength on axial position.

The effect of the gradual reduction of the magnetic field on the injection parameters for the electron beam can be evaluated by integrating the transverse component of the magnetic force to obtain the change in transverse momentum and position as the electrons leave the interaction region. If it is assumed that the magnetic field falls to zero as $B=(1+z/z_0)$. $B_0[x\sin(2\pi z/\lambda_q)+y\cos(2\pi z/\lambda_q)]$ and the equation is solved for the change $\Delta p_x$ in x momentum between $z=-z_0$. This is obtained:

$$\Delta p_x = \int \dot{p}_x \, dt \sim e \int \left(\frac{dz}{c}\right) B_y$$

$$= -\left(\frac{eB_0}{c}\right) \cdot \left(\frac{\lambda_q}{2\pi}\right)^2 \left(\frac{1}{z_0}\right) \cos\left(\frac{2\pi z_0}{\lambda_q}\right).$$

The transverse angular deflection of the electron beam scales as $1/z_0$ and can be reduced to an arbitrarily small value by increasing $z_0$. To obtain the transverse position, $\Delta x$, at which the electron beam must be injected, we integrate $v_x=(p_x/\gamma m)$ to obtain $$\Delta x = \left(\frac{eB_0}{\gamma mc^2}\right) \left(\frac{\lambda_q}{2\pi}\right)^3 \left(\frac{1}{z_0}\right) \sin\left(\frac{2\pi z_0}{\lambda_q}\right).$$

The spatial transverse displacement also scales as $1/z_0$. In practice, $z_0$ cannot be made arbitrarily large, and it is necessary to make a realistic estimate of the extent to which the displacement of the electron beam by the fringing fields needs to be reduced so that a realistic compromise can be reached in the design of the magnet.

While the invention has been described in its preferred embodiment it is understood that the words which have been used are words of description rather than words of limitation and that changes with the purview of the appended claims may be made without departing from the scope and spirit of the invention in its broader aspects.

What is claimed is:

1. In a free electron laser the improvement residing in a periodic magnet means said magnet means comprising coaxial bifilar helical conductor means, bifilar conductors being 180° displaced and conducting current in opposite directions, said bifilar helical conductor means comprising multiple layers of said bifilar conductors each successive layer thereof extending an increment beyond its antecedent layer to effect a uniform tapered termination configuration, and a current source connected to supply current thereto.

* * * * *